United States Patent
Rideout et al.

(10) Patent No.: US 6,677,893 B2
(45) Date of Patent: Jan. 13, 2004

(54) METHOD AND APPARATUS FOR LOCATING THE SOURCE OF UNKNOWN SIGNAL

(75) Inventors: Robert M Rideout, Defford (GB); Paul R Edmonds, Defford (GB); Simon R Duck, Defford (GB); David P Haworth, Defford (GB); Christopher Griffin, Defford (GB)

(73) Assignee: QinetiQ Limited, Farnborough (GB)

( * ) Notice: Subject to any disclaimer, the term of this patent is extended or adjusted under 35 U.S.C. 154(b) by 0 days.

(21) Appl. No.: 10/276,592

(22) PCT Filed: Mar. 18, 2002

(86) PCT No.: PCT/GB02/01255
§ 371 (c)(1),
(2), (4) Date: Nov. 19, 2002

(87) PCT Pub. No.: WO02/077662
PCT Pub. Date: Oct. 3, 2002

(65) Prior Publication Data
US 2003/0117319 A1 Jun. 26, 2003

(30) Foreign Application Priority Data
Mar. 27, 2001 (GB) .............................. 0107610

(51) Int. Cl.[7] .............................................. H04B 7/185
(52) U.S. Cl. .................... 342/353; 342/357.16; 342/444
(58) Field of Search ............................ 342/353, 357.16, 342/444

(56) References Cited

U.S. PATENT DOCUMENTS

| | | |
|---|---|---|
| 5,008,679 A | 4/1991 | Effland |
| 5,594,452 A | 1/1997 | Webber et al. |
| 6,018,312 A | 1/2000 | Haworth |

FOREIGN PATENT DOCUMENTS

| | | |
|---|---|---|
| GB | 2 321 356 | 7/1998 |
| WO | WO 00/14587 | 3/2000 |
| WO | WO 01/14902 | 3/2001 |

OTHER PUBLICATIONS

Stein, "Algorithms for Ambiguity Function Processing", IEEE Transactions on Acoustics, Speech, and Signal Processing, vol. ASSP.29, No. 3, Part 2, Jun. 1981, pp. 588.599.

Chestnut, "Emitter Location Accuracy Using TDOA and Differential Doppler", IEEE Transactions on Aerospace and Electronic Systems, Mar. 1982, pp. 214–218.

*Primary Examiner*—Theodore M. Blum
(74) *Attorney, Agent, or Firm*—Nixon & Vanderhye P.C.

(57) ABSTRACT

A method of locating the source of an unknown signal of varying frequency received by receive antennas (16, 18) via relay satellites (12, 14) involves downconversion of received signals to a first intermediate frequency (IF) and band-limiting the downconverted signals. The band-limited signals are constrained to lie within a prearranged acquisition signal bandwidth by adjustment of local oscillator (LO) downconversion frequency to counteract frequency change in the unknown signal. Downconverted signals are offset in time relative to one another using trial values of differential time offset and their correlation is determined for each trial value to provide actual time offset. Compensation is provided for change in correlation phase angle, which results from signals being downconverted experiencing different LO frequencies during the time interval of the trial offset.

8 Claims, 8 Drawing Sheets

METHOD AND APPARATUS FOR LOCATING THE SOURCE OF UNKNOWN SIGNAL

BACKGROUND OF THE INVENTION

This application is the U.S. national phase of International Application No. PCT/GB02/01255, filed Mar. 18, 2002, which designated the U.S., the entire content of which is hereby incorporated by reference.

This invention relates to a method and an apparatus for locating the source of an unknown signal received by a plurality of signal relays.

The invention is particularly relevant to communications using Earth-orbiting satellite relays. Interference occurring in a satellite communications channel is a serious problem that can deny use of the channel to a legitimate user. Occurrences of interference number thousands annually, and are likely to grow due to the proliferation of satellite-based services, the emergence of personal satellite communications, and the ever-increasing congestion of the geostationary arc. Interference may result from equipment failure or human error such as incorrect orientation of an antenna, but it may also represent deliberate unauthorised use of a satellite communications channel or an attempt to deny it to other users.

In IEEE Trans. on Aerospace and Electronic Systems, Vol. AES-18, No. 2 March 1982, P C Chestnut describes the basic technique of locating an unknown signal source: it involves determining the time difference of arrival (TDOA) and/or frequency difference of arrival (FDOA) of two signals from the source relayed to receivers. The signals are relayed along two independent signal paths to a receiving station. TDOA and FDOA are also known as differential time offset (DTO) and differential frequency offset (DFO) or differential Doppler. The technique of determining DTO and DFO from two received signals is described in IEEE Trans. on Acoustics Speech and Signal Processing, Vol. ASSP-29, No. 3, June 1981 by S Stein in a paper entitled "Algorithms for Ambiguity Function Processing". The technique involves deriving the degree of correlation between the signals by multiplying them together and integrating their product. Trial relative time shifts and frequency offsets are introduced in sequence between the signals and their correlation is determined for each. The time shift and frequency offset which maximise the correlation are taken to be the required DTO and DFO, subject to correction for signal propagation delays in satellite transponders and frequency shifts in satellites and in processing.

U.S. Pat. No 5,008,679 relates to a transmitter location system incorporating two relay satellites and using both DTO and DFO measurements. The relay satellites are in geostationary or geosynchronous orbits and they relay signals along two independent signal paths to a receiving station, i.e. ground—satellite—ground paths. Each satellite accepts a signal (uplink) from the source, frequency shifts it using a turn-round oscillator and returns its frequency-shifted equivalent (downlink) to a ground receiver. The two signal path lengths are normally unequal, and this gives two signal arrival times at the receiver differing by the TDOA value. FDOA is due to relay satellite motion relative to the Earth and to one another, which Doppler shifts both downlink signal frequencies: the Doppler shifts are normally unequal because the satellites' velocities differ, so the signals' frequencies differ after they have passed via respective satellites. There is also a contribution to signal frequency difference from the difference between the frequencies of the two satellites' respective frequency translation or turnround oscillators used for mixing uplink signals before retransmission for downlink. The positions and velocities of the two satellites and the receiving station's position are known, and the locus of points of constant TDOA or FDOA is in each case a surface which intercepts the Earth's surface to define a curve referred to as a line of position (LOP). Two measurements of TDOA or FDOA at different times, or one of each at one or more times, provides two LOPs which intersect at the position of the source to be located.

In the prior art, TDOA is also referred to as differential time offset (DTO) and FDOA as differential frequency offset (DFO) or differential Doppler shift, and the expressions DTO and DFO will be used hereinafter.

The degree of correlation is determined from what is referred to as the cross ambiguity function or CAF $A(\tau,\nu)$ defined by:

$$A(\tau, \nu) = \int_{-T/2}^{T/2} s_1^*(t) s_2(t+\tau) e^{-2\pi i \nu t} dt \qquad (1)$$

$A(\tau,\nu)$ is the integral of the product of two complex signals $s_1(t)$ and $s_2(t)$ after a trial time shift $\tau$ and a trial frequency shift $\nu$ have been introduced between them in processing after reception at the receiving station. The asterisk in $s_1^*(t)$ indicates a complex conjugate. A maximum value of the modulus of $A(\tau,\nu)$, i.e. $|A(\tau,\nu)|$ is a peak in the surface $|A(\tau,\nu)|$ as a function of the two variables $\tau$ and $\nu$, and the values of $\tau$ and $\nu$ yielding this peak are the required DTO and DFO.

Since $|A(\tau,\nu)|$ is a function of two variables $\tau$ and $\nu$, it is two-dimensional and defines a surface referred to as the Ambiguity Surface: it may be calculated using a Fast Fourier Transform (FFT) technique. In one such approach a succession of lines in the Ambiguity Surface are calculated with varying $\nu$ (trial DFO) and respective constant values of $\tau$ (trial DTO): This effectively decomposes the surface into a series of 1-dimensional slices perpendicular to the $\tau$ axis and referred to as 'DFO Slices'. An efficient operation to compute a DFO Slice is FFT $(s_1^*(t)s_2(t+\tau))$. Performing this computation for each practical value of $\tau$ and combining slices gives the Ambiguity Surface.

U.S. Pat. No. 6,018,312 to Haworth relates to a transmitter location system employing a reference signal passing via the same satellite relays as the unknown signal and processed in phase coherence with it. The reference signal is used to remove sources of error and operational limitations: it gives improved accuracy and extends the range of conditions over which measurements can be made. Another technique for counteracting sources of error using a broad band approach is disclosed in U.S. Pat. No. 5,594,452 to Webber et al.

International Patent Application No. GB 00/02940 relates to a modification to the technique of U.S. Pat. No. 6,018,312 to deal with the problem of time-varying DTO and DFO.

There is particular difficulty in locating a source of interference which is frequency agile, i.e. interference that is subject to changes in carrier frequency. The reason for this is as follows: the performance of the correlation process expressed by the Complex Cross Ambiguity Function depends on achieving an output signal-to-noise ratio (SNR), which is defined by $$SNR = 2BTsnr_1 \frac{snr_2}{1 + snr_1 + snr_2}, \quad (2)$$

where B is the acquisition sample bandwidth of primary and secondary receiver channels used to receive signals from respective satellites, and T is the integration time as defined in Equation (1) for the CAF $A(\tau,\nu)$. The acquisition sample bandwidth is the bandwidth within which a signal must lie to be detectable by a receiver, and is defined by the receiver's signal processing system. The primary channel is associated with the ground-based receiver or antenna directed at an interference-affected satellite, and the secondary channel is associated with another receiver directed at a further satellite via which an unknown transmitter causing the interference is also detectable. The terms $snr_1$ and $snr_2$ are respectively the input signal-to-noise ratios in the primary and secondary channels. The term 2BT is called the Processing Gain.

To achieve reliable detection of a correlation peak in the modulus $|A(\tau,\nu)|$ of the CAF $A(\tau,\nu)$, the SNR in Equation (2) should exceed ~100 (i.e. 20dB): if $snr_1$ and $snr_2$ are fixed, this criterion defines the required Processing Gain 2BT for successful location of unknown sources.

For a fixed frequency signal from an unknown transmitter, i.e. a signal with constant carrier frequency, the maximum available Processing Gain of the relevant receiver channel is twice the channel's integration time multiplied by its Complex Sample Rate (equal to its acquisition sample bandwidth described later in more detail). This sample bandwidth is set as close as possible to the instantaneous bandwidth of the signal to minimise the extraneous signal and noise components An unknown transmitter may generate a signal from a non-stationary (varying) carrier frequency, in which case the associated interference with a satellite relay also varies in frequency: to acquire this interference and maintain it within a receiver channel's acquisition sample bandwidth requires wideband sampling and therefore a higher Processing Gain than in the constant carrier frequency interference equivalent. A typical receiver channel contains analogue to digital converters (ADCs) and storage facilities, and the speed of the former and the capabilities of the latter are also limiting factors in terms of the maximum rate of change of frequency of interference that can be tolerated by the channel while still successfully carrying out geolocation. Moreover, widening the receiver channel's acquisition sample bandwidth necessarily makes it more likely that unwanted signals will be included in the correlation operation defined in Equation (1): this adds to the noise level with respect to the interference and therefore reduces the signal to noise ratios in the primary and secondary channels; it also provides the Ambiguity Surface with additional correlation spikes not associated with the relevant unknown transmitter, and produces confusion over which spike is correct. It is therefore desirable to avoid wideband sampling and processing.

SUMMARY OF THE INVENTION

It is an object of this invention to provide an alternative method and apparatus for transmitter location.

The present invention provides a method of locating the source of an unknown signal of varying frequency received by a plurality of signal relays, the method including the steps of:

a) arranging for a plurality of receivers to receive the unknown signal via respective signal relays;

b) using a local oscillator (LO) signal to downconvert signals received by respective receivers to an intermediate frequency (IF);

c) introducing trial values of differential time offset DTO) between received signals; characterised in that the method also includes the steps of:

d) constraining the downconverted signals to lie within a prearranged bandwidth by adjusting the LO signal frequency to counteract frequency change in the unknown signal; and e) counteracting changes in correlation phase angle of correlated signals relatively offset from one another in time and associated with differing LO frequencies by virtue of the offset and the LO signal frequency adjustment.

When the procedure of adjusting the LO signal frequency to counteract frequency change in the unknown signal was first carried out, the results of target location were much poorer than had been expected and the reason for this was very hard to find. After considerable research it was found surprisingly that adjustment of the LO signal frequency and introduction of trial values of relative time offsets introduced an error: as will be described later in more detail, it meant that for a length of time equal to the trial offset pairs of signals to be correlated were being downconverted by LO signals of different frequency. When this effect was counteracted, considerable improvement in correlation peak definition was obtained, which is the advantage of the invention.

The step of compensating for changes in correlation phase angle may comprise calculating and applying to correlation products of signals a phase correction $e^{i\Delta\phi}$, $\Delta\phi$ is a change in correlation phase angle equal to $2\pi\tau(f_a-f_b)$, $\tau$ is a trial DTO value with which the correlated signals are relatively offset from one another and $f_b$ and $f_a$ are LO frequencies before and after adjustment respectively.

The step of downconverting signals may comprise downconverting frequency varying signals to a substantially constant frequency and band-limiting them, and further downconverting the band-limited signals for subsequent processing including digitisation and correlation.

The step of constraining the downconverted signals to lie within a prearranged bandwidth comprises identifying a frequency of maximum power in a frequency spectrum associated with received signals and determining therefrom an LO signal frequency appropriate for downconverted signals to be obtained within the prearranged bandwidth.

In another aspect, the present invention provides apparatus for locating the source of an unknown signal of varying frequency received by a plurality of signal relays, the apparatus including:

a) a plurality of receivers for receiving the unknown signal via respective signal relays;

b) a signal generator for providing a local oscillator (LO) signal to downconvert signals received by respective receivers to an intermediate frequency (IF);

c) a correlation processor for introducing trial values of differential time offset (DTO) between received signals;

characterised in that the apparatus also includes:

d) processing means for:
  i) constraining the downconverted signals to lie within a prearranged bandwidth by adjusting the LO signal frequency to counteract frequency change in the unknown signal; and
  ii) counteracting changes in correlation phase angle of correlated signals relatively offset from one another in time and associated with differing LO frequencies by virtue of the offset and the LO signal frequency adjustment.

The processing means may be arranged to calculate and apply to correlation products of signals a phase correction $e^{i\Delta\phi}$, $\Delta\phi$ is a change in correlation phase angle equal to $2\pi\tau(f_a-f_b)$, $\tau$ is a trial DTO value with which the correlated signals are relatively offset from one another and $f_b$ and $f_a$ are LO frequencies before and after adjustment respectively. It may also be arranged to downconvert frequency varying signals to a substantially constant frequency and band-limit them, and further downconvert the band-limited signals for subsequent processing including digitisation and correlation. It may further be arranged to constrain the downconverted signals to lie within a prearranged bandwidth by identifying a frequency of maximum power in a frequency spectrum associated with received signals and determining therefrom an LO signal frequency appropriate for downconverted signals to be obtained within the prearranged bandwidth.

BRIEF DESCRIPTION OF THE DRAWINGS

In order that the invention might be more fully understood, embodiments thereof will now be described, by way of example only, with reference to the accompanying drawings, in which.

DETAILED DESCRIPTION OF THE PREFERRED EMBODIMENTS

Figure 1:
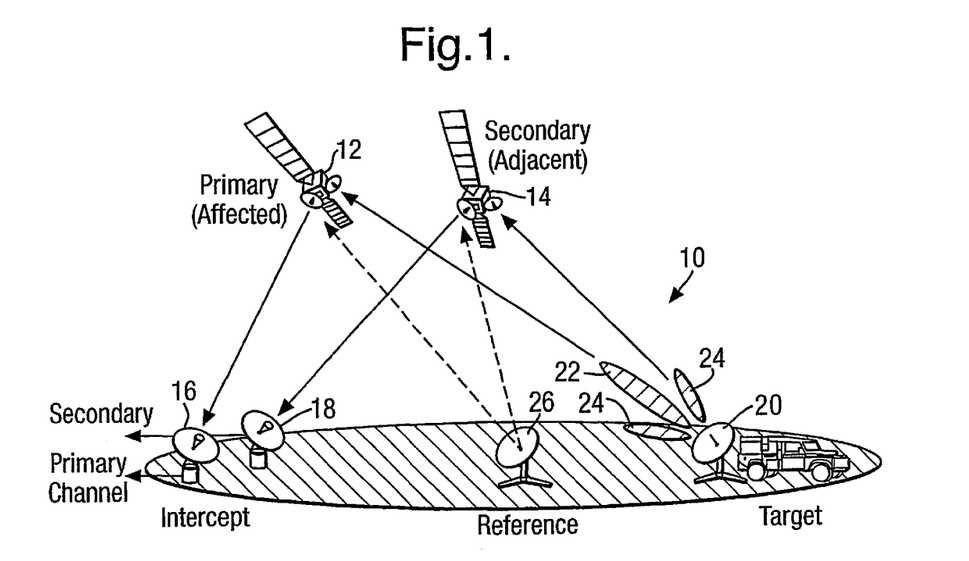
FIG. 1 illustrates a prior art geolocation system.

FIG. 1 illustrates a prior art geolocation system indicated generally by 10: it is appropriate for signals which—over a measurement time interval—are substantially constant in carrier frequency. It uses two satellites 12 and 14 monitored by respective receive antennas 16 and 18 to find the location of an unknown transmitter (target) 20 causing interference to satellite communications. The transmitter 20 has a multi-lobed transmit radiation pattern of which a main lobe 22 and two sidelobes 24 are shown. One satellite 12 receives radiation in the main lobe 22: it is designated the primary satellite and processing electronics (not shown) associated with its monitoring receive antenna 16 are designated the primary channel. The other satellite 14 receives radiation in the sidelobe 24: it is designated the secondary satellite and associated processing electronics at receive antenna 18 are designated the secondary channel. The primary and secondary channels produce signals, which are processed to become signals $s_1$ and $S_2$ respectively for use in Equation (1). Both satellites 12 and 14 also receive a reference signal from a transmitter 26 at a known location and relay it to respective antennas 16 and 18. This reference signal is used as described in U.S. Pat. No. 6,018,312.

Figure 2:
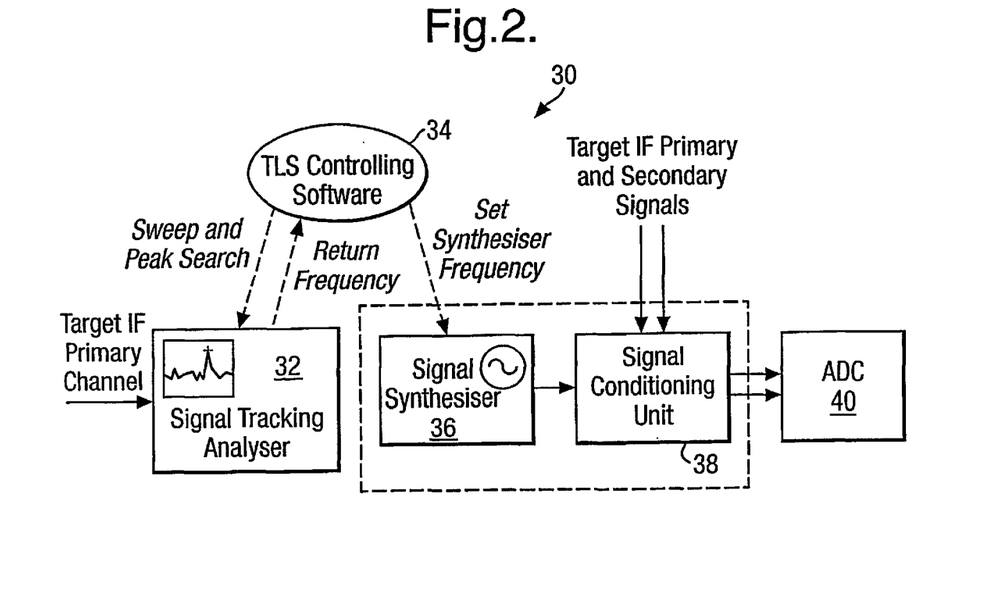
FIG. 2 is a block diagram of a signal processing system for use in the method of the invention for geolocation of interference with varying carrier frequency.

Referring now also to FIG. 2, there is shown a block diagram of a signal processing system 30 for use in accordance with the invention for geolocation when the unknown transmitter or target 20 causing interference has a carrier frequency which varies with time. The system 30 is employed with the geolocation system 10. Ku-band-signals at 14GHz are uplinked to satellites 12 and 14, frequency translated by 1.5GHz and relayed back to ground (downlink) at 12.5GHz. All frequencies are nominal values: in practice there will be differences between the uplink, translation and downlink frequencies. When received by the system 30, signals from the satellites 12 and 14 are downconverted (not shown) from 12.5GHz to a first intermediate frequency (IF) of 140 MHz nominally—this is not exact because it depends on the frequency of the original output signal from the target 20 which is not constant as has been indicated.

The IF signal in the primary channel (i.e. corresponding to the target main lobe) is fed into a conventional frequency spectrum analyser 32 (Hewlett Packard type BP8565), referred to as a signal tracking analyser. The signal tracking analyser 32 has a General Purpose Interface Bus (GPIB) port (not shown) that allows it to be controlled by computer via a cable connected to this port. The computer has appropriate device driver software for the analyser 32: the driver translates high-level software commands (e.g. a command referred to as "PeakSearch") into object code which control the analyser 32 to perform automatically a specific function that an operator might do manually. In the present case the analyser 32 can execute many times a second functions such as "determine frequency of maximum signal power", which is equivalent to manual activation of a peak-search button with which the analyser 32 is equipped.

The analyser 32 displays a spectrum of a frequency interval in its input signal: It provides a spectrum in terms of the average signal power in each of a number of frequency sub-intervals (frequency bins) into which it divides a signal spectrum and associated frequency interval. Its display sweeps repeatedly through this interval, which is tuned manually until it contains the primary channel signal (normally a single peak). If the frequency of the primary channel signal changes, the position of its peak in the frequency interval will change. The size of the swept interval, its centre frequency and the length of time for a sweep are selected by an operator based on the following:

Sweep centre frequency:—in cases where the rate of change of frequency of the interference (its "frequency rate") is relatively high (a few MHz/s) it is necessary to anticipate frequency change: this involves moving the centre frequency of the swept interval as necessary to maintain the interfering signal within the swept interval while samples of the primary and secondary channel signals are being acquired. One solution to this is to retune the centre frequency automatically during such sample acquisition.

Swept interval:—the extent of the swept interval—i.e. its range of frequencies—should be sufficiently large to maintain the frequency of the interfering signal within it while samples of primary and secondary channel signals are being acquired; it should also be sufficiently small to exclude unwanted signals of greater magnitude than the required signal: the required signal then becomes the largest magnitude signal in the swept interval and can be readily recognised.

The time taken for the signal tracking analyser 32 to perform a display trace sweep through the swept interval—the sweep time—should not be greater than the time taken for the centre frequency of the interference signal to leave a frequency band referred to as an acquisition sample bandwidth and defined by subsequent signal processing at lower frequency as will be described later. A convenient acquisition sample bandwidth is normally much smaller than the swept interval.

Resolution & video bandwidth—it is necessary to use resolution and video bandwidth settings for the signal tracking analyser 32 which are an order of magnitude smaller than the acquisition sample bandwidth to facilitate an accurate search (peak search) for a frequency spectrum peak corresponding to an interfering signal as will be discussed later in more detail.

A trade-off between swept interval, resolution & video bandwidth and sweep time as above is necessary since improving the performance of one requirement typically has detrimental effects of the other two: e.g. a wider swept frequency interval means a longer sweep time; a compromise based on signal characteristics (e.g. rate of change of signal frequency) and acquisition sample bandwidth is required.

The signal tracking analyser 32 operates under the control of computer software 34 running on a computer (not shown). Under this control it searches the swept interval for a frequency spectrum peak having maximum signal power (highest peak) and corresponding to a signal giving unwanted interference to a satellite. To achieve this it performs a spectral frequency sweep and identifies the frequency bin containing the maximum spectral power: this frequency bin indicates the current or instantaneous frequency of the interference, and the associated frequency is returned by the signal tracking analyser 32 to the computer.

The computer also controls a signal synthesiser 36, which generates a local oscillator signal with a frequency of 205.5 MHz nominally: this frequency is adjusted by the synthesiser 36 in response to the computer and in accordance with the interference frequency determined using the signal tracking analyser 32; its separation from the nominally 140 MHz IF interference signal is maintained accurately at 65.5 MHz. The local oscillator signal is supplied to a signal conditioning unit 38, which also receives the primary and secondary channel IF signals from the target 20. The unit 38 downconverts these IF signals to a second IF, filters them to provide band limiting, and downconverts them to a third IF or baseband for transfer to respective analogue to digital converters (ADCs) 40 for digitisation.

Figure 3:
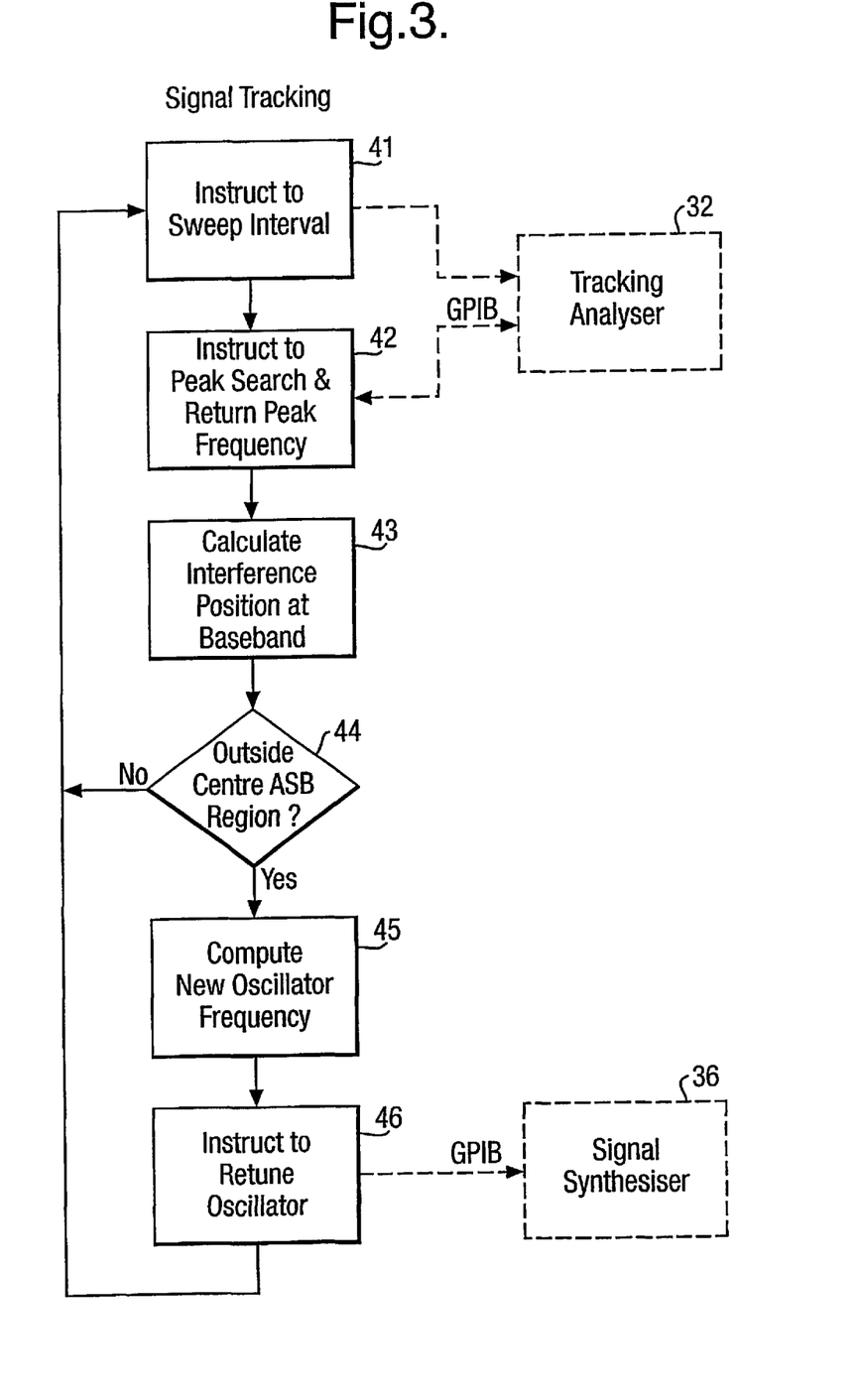
FIG. 3 is a block diagram of steps in the method of the invention.

The signal tracking procedure implemented by the computer controlling the signal tracking analyser 32 is shown in FIG. 3. A first step 41 is to instruct the analyser to perform a frequency sweep of a frequency interval; this is followed by an instruction 42 to perform a search to identify the swept interval frequency at which signal power is a maximum (peak power). The computer then at 43 calculates for the peak power frequency the baseband equivalent, i.e. the frequency to which the peak power frequency will be downconverted in the signal conditioning unit 38. At 44 the computer checks whether or not the baseband equivalent of the peak power frequency is within the central half of the acquisition sample bandwidth: if so, the computer returns to step 41 and repeats steps 41 to 44. If the baseband equivalent is outside the central half of the acquisition sample bandwidth, at 45 the computer computes a new oscillator frequency for downconverting the interference signal of interest and at 46 instructs the signal synthesiser 36 to supply it to the signal conditioning unit 38.

Figure 4:
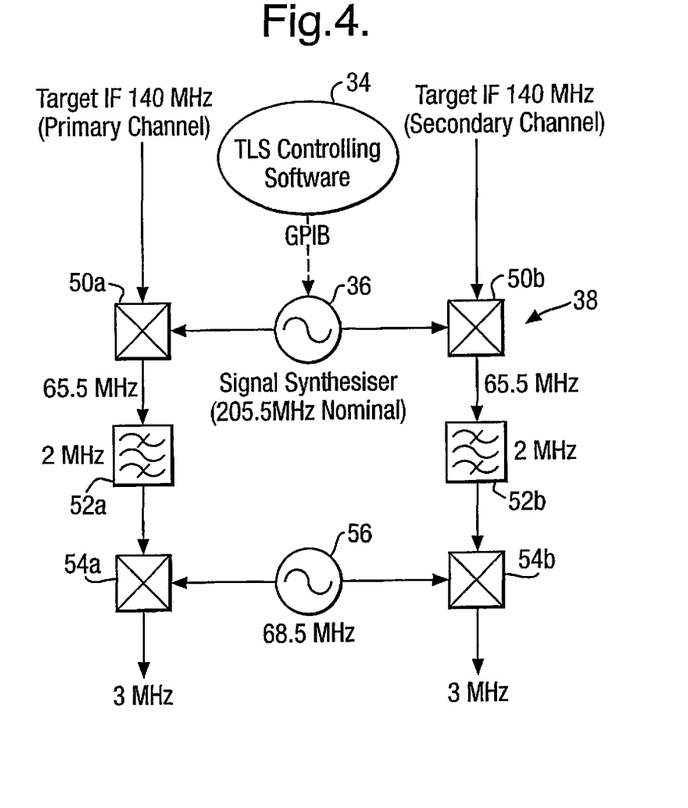
FIG. 4 illustrates signal frequency downconversion in the method of the invention.

Referring now also to FIG. 4, in which elements described earlier are like referenced, the signal conditioning unit 38 is shown in more detail. Primary and secondary channel signals are each input to the signal conditioning unit 38 at first IF with a nominal centre frequency of 140 MHz and a bandwidth of 80 MHz: i.e. the primary and secondary signal bands each extend from 100 MHz to 180 MHz. The signal synthesiser 36 provides a local oscillator (LO) signal whose frequency (nominally 205.5 MHz) is controlled by the computer controlling the signal tracking analyser 32 as described above: the LO frequency is accurately 65.5 MHz greater than the primary channel signal. This LO is mixed with the primary and secondary channel signals in respective mixers 50a and 50b to downconvert their nominal 140 MHz IF to a second IF of 65.5 MHz with bandwidth remaining at 80 MHz: the downconverted bandwidth therefore extends from 25.5 MHz to 105.5 MHz. Downconversion is what is referred to as "high side", i.e. the LO frequency is greater than the signal frequency: this allows downconversion of the full 80 MHz bandwidth to the second IF with a centre frequency of 65.5 MHz and avoids any degree of spectrum inversion (negative difference frequencies becoming detected as positive frequencies).

The 80 MHz bandwidth of the primary and secondary channel signals is reduced to 2 MHz by respective bandpass filters 52a and 52b each with a centre frequency of 65.5 MHz. The filters 52a and 52b provide band-limited or narrow band signals which are fed to respective second mixers 54a and 54b for mixing with a further, fixed frequency LO of 68.5 MHz from a generator 56: this provides downconversion of each of the primary and secondary channel signals to a third IF with a nominal centre frequency of 3 MHz and 2 MHz bandwidth. Here again downconversion is high side.

The 3 MHz primary and secondary channel signals are digitised at 40 at a rate of 10.24 MHz (5.12 MHz bandwidth) digitally centred on the third IF (3 MHz). The digitised data so produced is then digitally split and mixed with digital sine and cosine waves followed by low pass filtering: this generates two data streams phase-shifted by 90° relative to one another (i.e. real and imaginary parts), and it also downconverts the nominally 3 MHz centre frequencies to baseband. The baseband data is then downsampled to a predetermined, user-defined acquisition sample bandwidth (maximum downsampling produces typically 10kHz; minimum (or zero downsampling) produces 5.12 MHz): set up in a graphical user interface on the computer mentioned above which controls data acquisition, signal tracking and processing. It should be noticed however that although an acquisition sample bandwidth of 5.12 MHz is possible by this analogue to digital conversion process, in the present example the signals are filtered to a passband of 2 MHz during signal conditioning (i.e. no frequencies outside this bandwidth will be seen).

Figure 5:
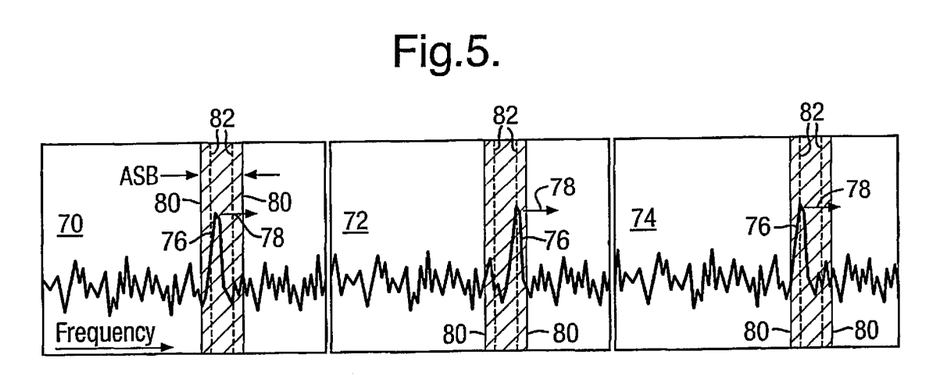
FIG. 5 illustrates definition of an acquisition sample bandwidth to contain downconverted signals.

FIG. 5 illustrates the procedure for re-tuning the signal synthesiser LO frequency (205.5 MHz nominal) to maintain the target or interference signal frequency within the acquisition sample bandwidth as that frequency changes. The drawing shows three schematic representations 70, 72 and 74 of a frequency spectrum displayed by the signal. tracking analyser 32. A carrier frequency of an interference signal indicated by a peak 76 is increasing in frequency and therefore moving to the right in the spectrum as indicated by an arrow 78. The signal conditioning unit 38 has a detection band for signals, and this is the acquisition sample bandwidth for the signal processing system 30 previously mentioned. The acquisition sample bandwidth is at the third IF, but it can be projected back through the downconversion process to the second or first IF. When projected back on to each of the signal tracking analyser's displayed spectra 70 to 74, the acquisition sample bandwidth is represented by the interval between a pair of solid lines 80. A pair of chain lines defines a central region 82 of the acquisition sample bandwidth 80, the former being half the width of the latter.

When the interfering signal peak 76 drifts in frequency through the acquisition sample bandwidth 80 so that it reaches an edge 82a of the central region 82 as shown in spectrum 72, the computer controls the signal synthesiser 36 to change the LO frequency (nominally 205.5 MHz): this moves the centre frequency of the acquisition sample bandwidth and repositions the interfering signal peak at the other edge 82b of the central region 82 so that it can drift through this region again.

When this procedure was first carried out, the results of target location were much poorer than had been expected and the reason for this was very hard to find. After a considerable amount of research it was found surprisingly that the problem lay in the combination of the following two procedures which it was discovered are not compatible with one another:

(a) retuning the centre frequency of the acquisition sample bandwidth by changing the LO signal frequency produced by the signal synthesiser 36, and (b) introducing trial values of relative time offsets between the primary and secondary channel signals in order to find a correlation peak in the CAF $A(\tau,v)$ defined by Equation (1).

Figure 6:
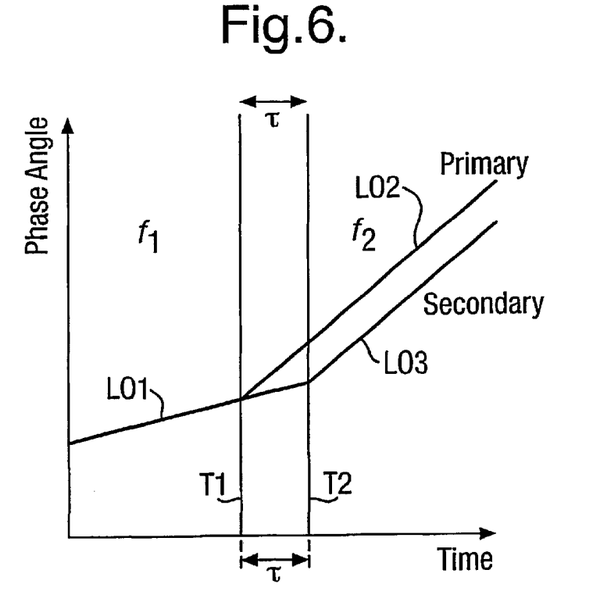
FIG. 6 is a graph of LO phase angle against time illustrating the effect of LO retuning on two signals with a relative time offset.

The reason the two procedures are incompatible with one another will be described with reference to FIGS. 6 and 7, which provide graphs of phase angle against time for the LO signal produced by the signal synthesiser 36 and for the correlation product $S_1^*s_2$ of two signals $s_1$ and $s_2$ (omitting (t) for convenience) respectively. The slopes of the graphs in FIG. 6 indicate the LO frequency in each case. FIG. 6 shows a graph LO1 for the LO signal at frequency $f_1$ prior to LO retune, and graphs LO2 and LO3 for the LO signal after an LO retune to a new frequency $f_2$: graphs LO2 and LO3 relate to the LO signal as applied to the primary and secondary channel signals respectively.

For the purposes of determining the differential time offset (DTO) between the primary and secondary channel signals, a trial value of DTO—designated $\tau$—is introduced between them: in consequence the effective times of retune of the primary and secondary channel signals relative to one another are no longer the same. In this connection, referring to FIG. 6, a first vertical line T1 indicates a time of retune to a new LO frequency $f_2$ for the primary channel signal, and a second vertical line T2 indicates a time of retune for the secondary channel signal: the lines T1 and T2 are separated by the trial DTO value $\tau$ introduced between the primary and secondary channel signals. The effect of this is that, for the length of time $\tau$ between the lines T1 and T2, the primary and secondary channel signals are downconverted by different LO frequencies $f_1$ and $f_2$ due to differing times of retune.

Figure 7:
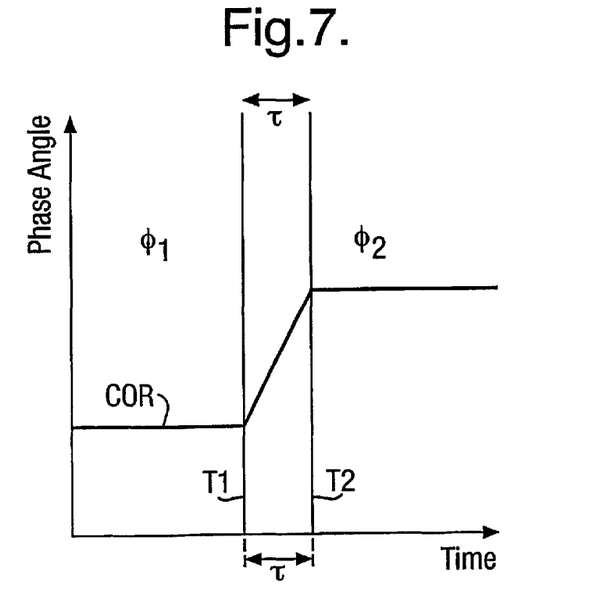
FIG. 7 is a graph of correlation phase angle against time illustrating the effect of LO retuning on the correlation product of two signals with a relative time offset.

FIG. 7 is a graph COR of correlation phase angle $\phi$ against time showing the effect of differing times of LO frequency retune: the correlation phase $\phi$ is defined as the phase angle of the product $s_1^*s_2$ of the primary and secondary channel signals $s_1$ and $S_2$ (* indicates complex conjugate) in digitised form. For convenience it has been assumed that there is zero frequency offset (DFO) between $s_1$ and $s_2$, and this is reflected in the zero gradient of the graph COR outside the region between lines T1 and T2.

Correlation phase angle gradient is normally constant with time, but the gradient changes over an interval $\tau$ between lines T1 and T2 during which the primary and secondary channel signals are downconverted at different frequencies $f_1$ and $f_2$: this effect introduces a change in correlation phase angle from $\phi_1$ to $\phi_2$. A non-continuous phase is not representative of a single frequency and is reflected in the FFT (or DFO slice) as multiple frequency (ambiguous) peaks. FIG. 7 shows that time biasing signals subject to LO downconversion at different frequencies changes correlation phase angle, and the result is a non-discrete DFO slice whose peak value may be confused and/or incorrect.

Figure 8:
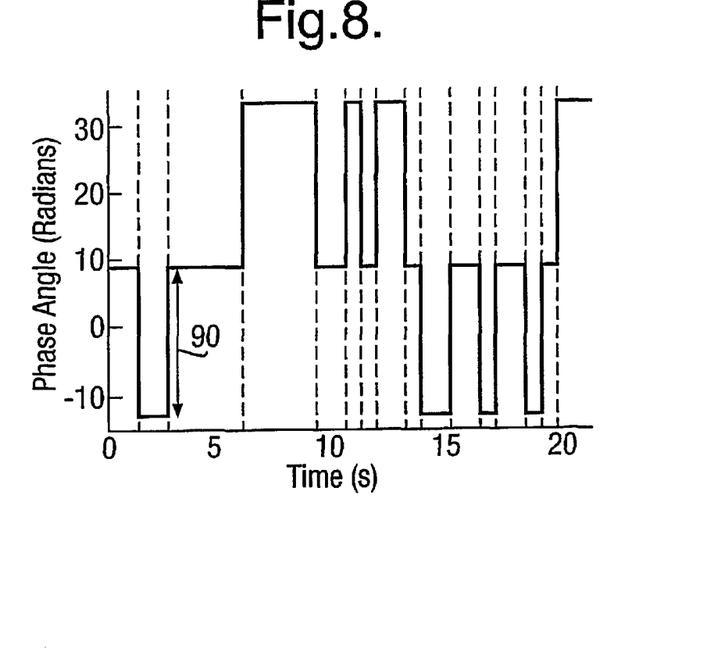
FIG. 8 is a graph of correlation phase angle against time for a simulated LO switching in frequency between 0 and 500Hz.

FIG. 8 is a graph of correlation phase angle against time for a simulated LO switching in frequency between 0 and 500Hz, 20 times at random intervals throughout a 20 second sample duration: phase shift appears as a solid line and shift times are dotted. Each change in LO frequency results in a phase discontinuity of ~22 radians as arrowed at 90.

Figure 9:
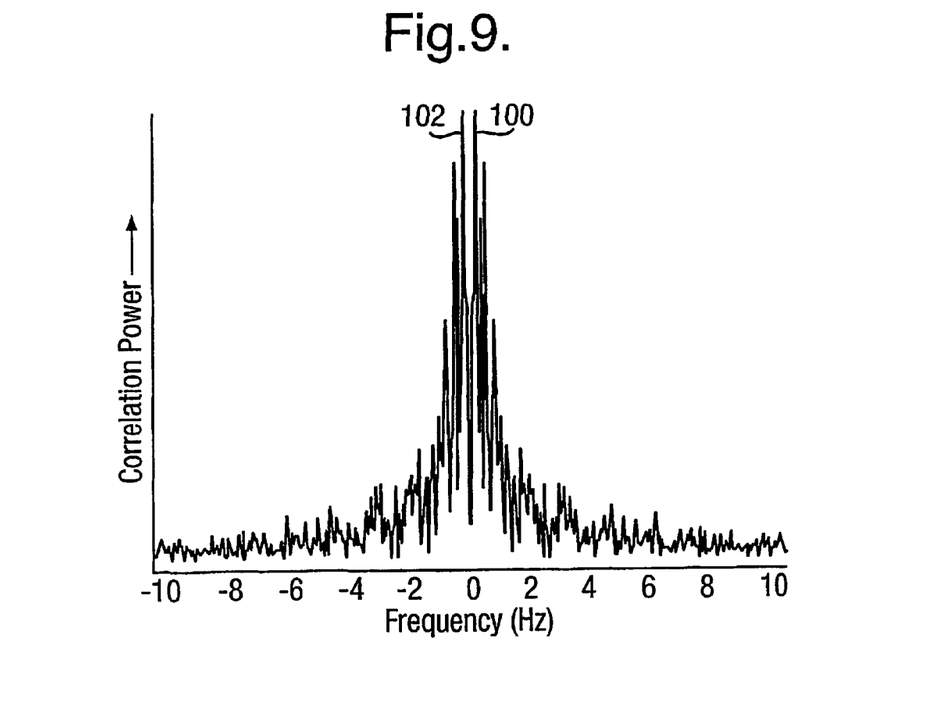
FIG. 9 is a graph of the FFT of the correlation product of primary and secondary channel signals after downconversion by an LO of time-varying frequency.

FIG. 9 is a graph of the FFT of the correlation product $s_1^*s_2$ of the primary and secondary channel signals $s_1$ and $S_2$ after downconversion by an LO of time-varying frequency: the two signals $s_1$ and $s_2$ are assumed to have zero DFO, and prior to cross-multiplication and transforming (FFT) for correlation purposes, $s_2$ is time-shifted relative to $s_1$ by $7\Delta T$, where $\Delta T$ is the sampling interval, i.e. the length of time between successive samples of $s_1$ or $s_2$ by ADCs 40. The graph therefore represents the modulus of the $FFT(s_1^*(t)s_2(t+7\Delta T))$, and it has two most central peaks 100 and 102 at ±0.23Hz. This represents the extent of error in the calculated DFO value. Misalignment of LO retuning due to time shifting broadens out what would otherwise have been a well defined peak for the modulus of the FFT of $s_1^*s_2$: so there is no longer a single well defined peak and no accurate value of DFO. FIG. 9 is in fact idealised: in the presence of noisy signals, the FFT shown loses its symmetry.

It is necessary to counteract the effect of LO frequency change on the correlation phase angle, and this is done by the computer previously referred to which controls signal tracking and frequency synthesis. Each time the signal synthesiser 36 is retuned, the computer records in computer file the old and new LO frequencies $f_1$ and $f_2$, together with the time of retune.

The process of acquiring data and then processing it are steps which may be separated by any convenient length of time, because acquired data may be archived for later processing. Data acquisition is begun by an operator setting up acquisition sample bandwidth size, data sample size etc as described earlier and then activating an "acquire" button on the computer's graphical user interface. If tracking mode is selected then while ADCs 40 are digitising and storing data to hard-disk, the signal tracking process described with reference to FIG. 3 starts to run. When a pre-determined data-set size is reached the acquisition process is halted and the signal tracking process is terminated. The controlling software 34 in the computer is now dormant and may be completely shut down and restarted prior to processing stored data.

At the time of data acquisition there is no offset or trial DTO introduced between $s_1$ and $s_2$. Such an offset is introduced during processing of acquired data when generating a particular slice of the ambiguity surface for the relevant value of trial DTO. For such a slice, the corresponding LO frequency change and trial DTO are known, hence the correlation phase correction can be calculated. For the next DFO slice a different trial DTO is used and a new sequence of phase corrections is calculated. Successive trial DTOs may conveniently be separated by the reciprocal of the sample rate of the ADCs 40.

To process acquired data it is read from-computer hard disk to memory. The ambiguity surface defined by Equation (1) is built up as a series of DFO slices, each one for a particular trial time bias. If retuning occurred, which is flagged in the recorded data, then for each slice, the phase correction is calculated for all data between the relevant pair of retune intervals. The correction is calculated using the particular trial value of DTO introduced between the primary and secondary channel signals and the difference between the LO frequencies before and after retune.

After conjugate multiplication and before calculating an FFT to generate a DFO slice, the computer's processing software implements the step of correcting the correlation phase discontinuity ($\phi_1 - \phi_2$). The computer implements the same phase correction to all correlation products $s_1^* s_2$ of the primary and secondary channel signals obtained in an interval between a pair of successive retunes. It calculates a new correction of this kind for the respective interval each pair of successive retunes. If the new LO frequency immediately after the nth retune is $f_n$, the LO frequency change at this retune is $(f_n - f_{n-1})$. The step in correlation phase angle due to the nth retune is $\Delta\phi_n$, and is given by the product of the angular frequency change in the LO $2\pi(f_n - f_{n-1})$ and the time offset or trial DTO value $\tau$:

i.e. $\Delta\phi_n = 2\pi\tau(f_n - f_{n-1})$ (3)

Figure 10:
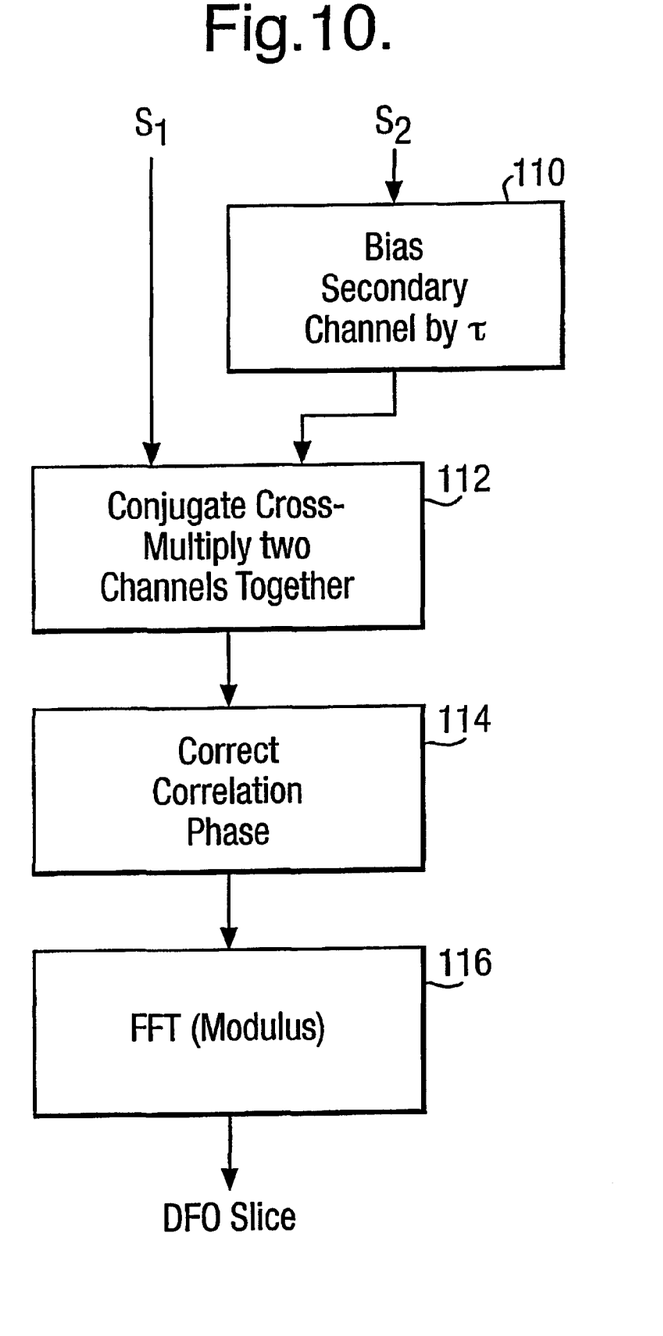
FIG. 10 is a flow diagram of steps to generate a phase-corrected DFO slice from digitised primary and secondary channel signals.

The computer calculates the change in correlation phase angle $\Delta\phi_n$ and from the latter the correlation phase correction $e^{i\Delta\phi_n}$: it multiplies all correlation products $s_1^* s_2$ obtained between the $n^{th}$ and $(n+1)^{th}$ retunes by this correction, and then calculates a new correction $e^{i(\Delta\phi_{n+1})}$ for application to correlation products between the $(n+1)^{th}$ and $(n+2)^{th}$ retunes. Strictly speaking the phase change in Equation (3) should be implemented gradually (i.e. at a constant rate) over the delay period $\tau$ for frequency changes during an observation period. However, the total duration of these delay periods is usually far less than the total observation period T in Equation (1), and can be neglected in most circumstances in forming Equation (1) so that the simpler approach described here is adequate FIG. 10 is a flow diagram of the steps required in generating a phase-corrected DFO slice from complex digitised values $s_1$ and $s_2$ of the primary and secondary channel signals. As previously discussed, combining DFO slices for different values of time offset or trial DTO value $\tau$ gives rise to the ambiguity surface.

An initial step in generating a phase-corrected DFO slice for a trial value of DTO $\tau$ is indicated at 110, and consists of offsetting or time biasing the secondary channel signal $s_2$ by $\tau$ with respect to the primary channel signal $s_1^*(t)$ to form $s_2(t+\tau)$: the former is then complex conjugated at 112 to form $s_1^*(t)$ and multiplied by $s_2(t+\tau)$ to form $s_1^*(t)s_2(t+\tau)$. A phase correction is then applied at 114, i.e. $s_1^*(t)s_2(t+\tau)e^{i\Delta\phi_n}$ is produced by multiplying by $e^{i\Delta\phi_n}$ using the phase angle $\Delta\phi_n$ calculated from Equation (3). At step 116 the modulus of the FFT of the result of the preceding step 114 is calculated, i.e. $|FFT(s_1^*(t)s_2(t+\tau)e^{i\Delta\phi_n})|$, which is the required phase corrected DFO slice corresponding to a time offset or trial DTO of $\tau$.

Figure 11:
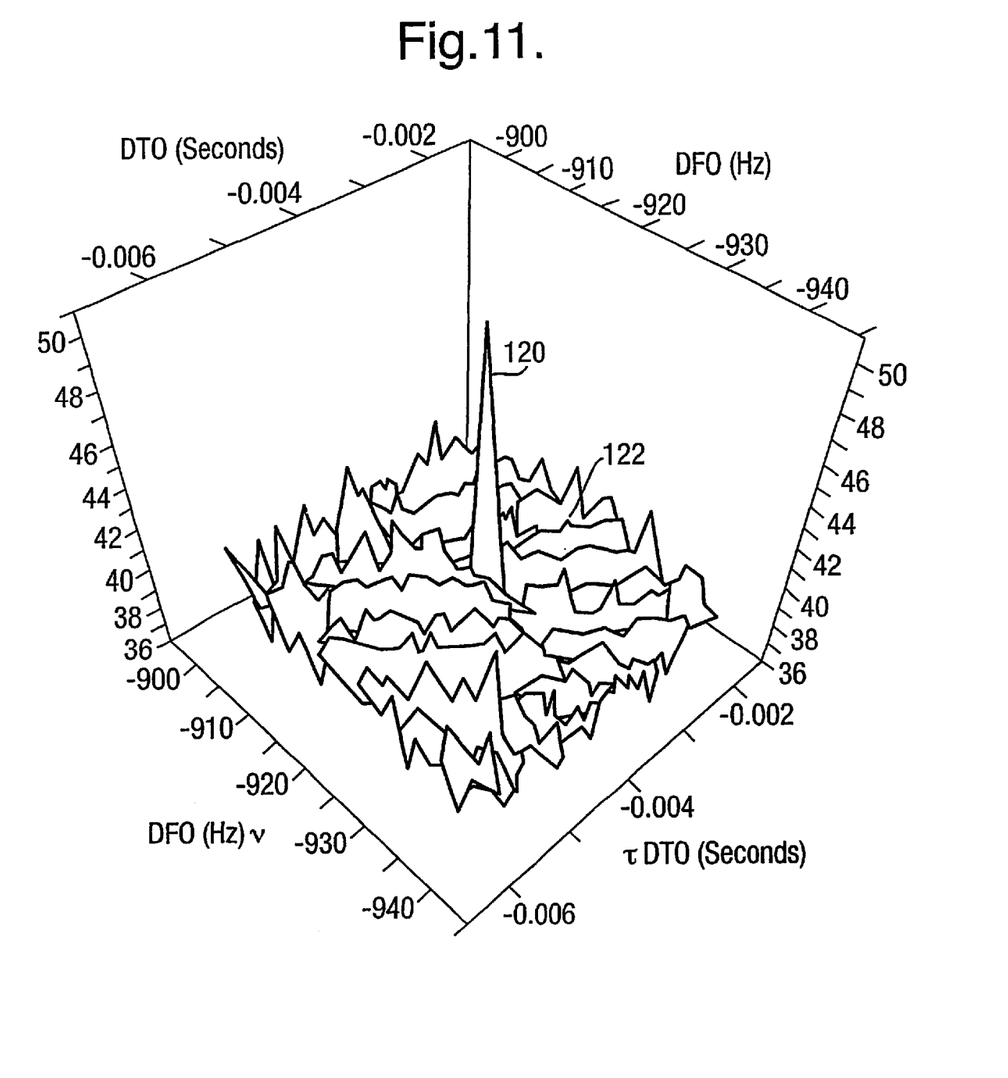
FIG. 11 is a plot of the modulus of the cross ambiguity function against trial DTO and DFO values.

FIG. 11 is a plot of the surface $|A(\tau,\nu)|$ (the modulus of the cross ambiguity function in Equation (1)) against trial DTO and DFO values $\tau$ and $\nu$. A well resolved correlation peak 120 appears at values $\tau$ and $\nu$ which are the correct values of DTO and DFO. The procedure for obtaining DTO and DFO and from them a target location is well known in the prior art cited above and will not be described.

As part of a trial to assess the effectiveness of the phase correction technique of the invention, satellite interference was simulated by generating a varying frequency signal, i.e. a signal with a frequency changing at random: this signal was transmitted via two satellites whose return signals were detected and downconverted to 140 MHz nominal to provide $s_1$ and $s_2$ with a known DTO of 0.246 ms calculated from satellite ephemerides and the knowledge of the transmit and receive site co-ordinates. The resulting $s_1$ was tracked in frequency using the method of the invention and sampled digitally. The DTO of 0.246 ms was then removed by time biasing $s_2$ appropriately relative to $s_1$, and $s_1$ and $s_2$ were then correlated with one another.

Figure 12:
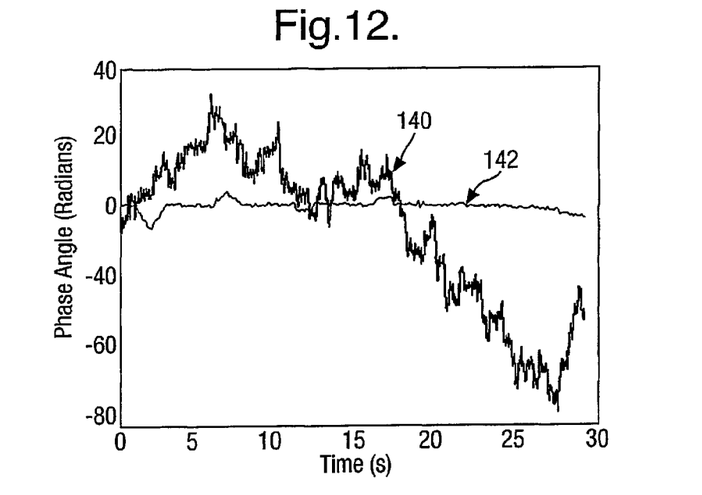
FIG. 12 shows variation in correlation phase angle during sample acquisition and the equivalent after phase correction in accordance with the invention.

FIG. 12 shows the variation (bold) 140 of the correlation phase angle throughout the time of sample acquisition (~27 s): this variation is between +40 and −70 radians. The signal synthesiser LO frequency (nominally 205.5 MHz) was re-tuned to maintain the simulated interference (i.e. the satellite return from the frequency sweeping signal) within the acquisition sample bandwidth: about three re-tunes per second were required using the acquisition sample bandwidth chosen. FIG. 12 also shows the correlation phase angle 142 after phase correction in accordance with the invention, and showing a great improvement has been obtained as regards approximation to constant phase gradient. The constant (zero-gradient) corrected correlation phase 142 implies a zero DFO.

Figure 13:
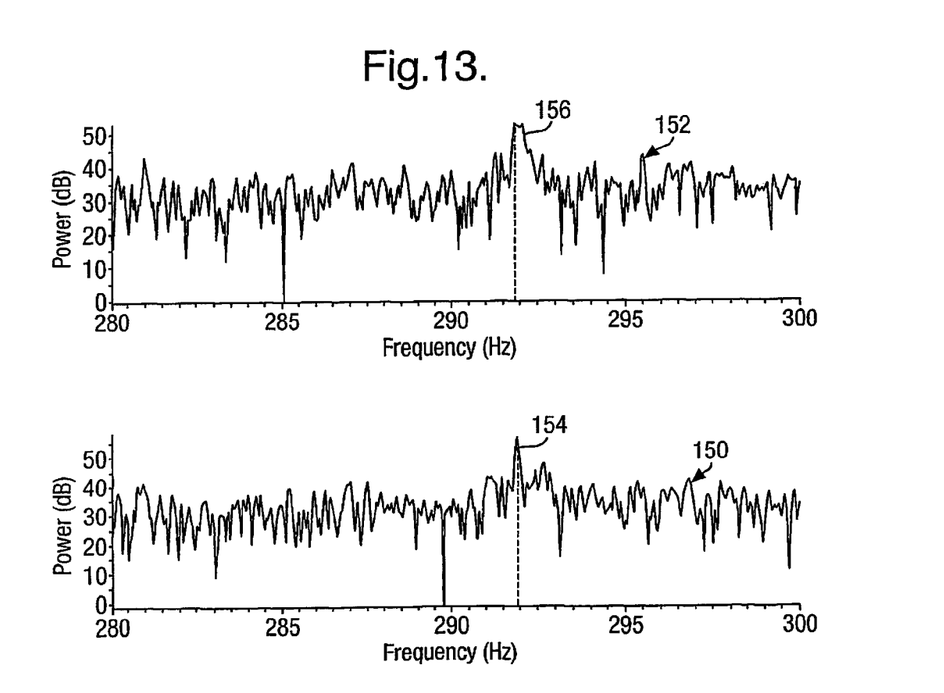
FIG. 13 shows two graphs 150 and 152 of correlation power against frequency for DFO slices obtained respectively with and without correlation phase angle correction.

Referring now to FIG. 13, this drawing illustrates the improvement in accuracy of DFO measurement provided by the invention. It shows two graphs 150 and 152 of correlation power (dB) against frequency (Hz) for DFO slices obtained respectively with and without correction of the change in correlation phase angle arising from re-tuning of the signal synthesiser LO frequency. These graphs were derived from data used to produce FIG. 12 and obtained in the trial referred to above. The graph 150 has a well-defined correlation peak 154, but the graph 152 has a broad and therefore inaccurately defined correlation peak 156. The peaks 154 and 156 illustrate the improvement in peak definition resulting from correlation phase angle correction in accordance with the invention: it reduces the uncertainty in the calculated DFO and increases the location accuracy of a target transmitter with varying frequency.

Data used to generate FIG. 13 was associated with a non-zero DFO. However, in order to show more clearly the effect of correcting correlation phase, the DFO was removed by offsetting $s_2$ by 291.95-Hz relative to $s_1$ prior to conjugate cross-multiplication. This provided a zero rate of change of correlation phase angle. The x-axes in FIG. 13 were then also adjusted to reflect the $s_2$ offset and show the peak 154 at an appropriate DFO.

The improvement in accuracy of DFO measurement for this trial was determined using a constant frequency reference signal transmitted from the same trial ground station as the simulated target signal to the two satellites used in the trial: this showed that peak 154 had a frequency error of only 0.002Hz whereas the peak 156 error was 0.390Hz, i.e. the former was nearly two hundred times smaller than the latter illustrating the advantage of the invention. The consequent improvement in target location accuracy varies with the positions of satellites, target and monitoring ground station. In the trial described above, a reduction in location error from ~100 kilometres to a few kilometres was obtained.

In respects other than use of a variable LO and correction of correlation phase angle, derivation of the location of a varying frequency transmitter producing interference on satellite relays will not be described further: it is as disclosed in the prior art for locating constant frequency transmitters, see for example U.S. Pat. No. 6,018,312.

What is claimed is:

1. A method of locating the source of an unknown signal of varying frequency received by a plurality of signal relays, the method including the steps of:
   a) arranging for a plurality of receivers to receive the unknown signal via respective signal relays;
   b) using a local oscillator (LO) signal to downconvert signals received by respective receivers to an intermediate frequency (IF);
   c) introducing trial values of differential time offset (DTO) between received signals;
   characterised in that the method also includes the steps of:
   d) constraining the downconverted signals to lie within a prearranged bandwidth by adjusting the LO signal frequency to counteract frequency change in the unknown signal; and
   e) counteracting changes in correlation phase angle of correlated signals relatively offset from one another in time and associated with differing LO frequencies by virtue of the offset and the LO signal frequency adjustment.

2. A method according to claim 1 characterised in that the step of compensating for changes in correlation phase angle comprises calculating and applying to correlation products of signals a phase correction $e^{i\Delta\phi}$, $\Delta\phi$ is a change in correlation phase angle equal to $2\pi\tau(f_a-f_b)$, $\tau$ is a trial DTO value with which the correlated signals are relatively offset from one another and $f_b$ and $f_a$ are LO frequencies before and after adjustment respectively.

3. A method according to claim 1 or 2 characterised in that the step of downconverting signals comprises downconverting frequency varying signals to a substantially constant frequency and band-limiting them, and further downconverting the band-limited signals for subsequent processing including digitisation and correlation.

4. A method according to claim 1 or 2 characterised in that the step of constraining the downconverted signals to lie within a prearranged bandwidth comprises identifying a frequency of maximum power in a frequency spectrum associated with received signals and determining therefrom an LO signal frequency appropriate for downconverted signals to be obtained within the prearranged bandwidth.

5. Apparatus for locating the source of an unknown signal of varying frequency received by a plurality of signal relays, the apparatus including:
   a) a plurality of receivers for receiving the unknown signal via respective signal relays;
   b) a signal generator for providing a local oscillator (LO) signal to downconvert signals received by respective receivers to an intermediate frequency (IF);
   c) a correlation processor for introducing trial values of differential time offset (DTO) between received signals;
   characterised in that the apparatus also includes:
   d) processing means for:
      i) constraining the downconverted signals to lie within a prearranged bandwidth by adjusting the LO signal frequency to counteract frequency change in the unknown signal; and
      ii) counteracting changes in correlation phase angle of correlated signals relatively offset from one another in time and associated with differing LO frequencies by virtue of the offset and the LO signal frequency adjustment.

6. Apparatus according to claim 5 characterised in that the processing means is arranged to calculate and apply to correlation products of signals a phase correction $e^{i\Delta\phi}$, $\Delta\phi$ is a change in correlation phase angle equal to $2\pi\tau(f_a-f_b)$, $\tau$ is a trial DTO value with which the correlated signals are relatively offset from one another and $f_b$ and $f_a$ are LO frequencies before and after adjustment respectively.

7. Apparatus according to claim 5 or 6 characterised in that the processing means is arranged to downconvert frequency varying signals to a substantially constant frequency and band-limit them, and further downconvert the band-limited signals for subsequent processing including digitisation and correlation.

8. Apparatus according to claim 5 or 6 characterised in that the processing means is arranged to constrain the downconverted signals to lie within a prearranged bandwidth by identifying a frequency of maximum power in a frequency spectrum associated with received signals and determining therefrom an LO signal frequency appropriate for downconverted signals to be obtained within the prearranged bandwidth.

* * * * *